April 23, 1929.  B. F. TEETOR  1,709,961
MOTOR DRIVEN CAR
Filed Sept. 22, 1927  2 Sheets-Sheet 1

Witness:
R. Burkhardt

Inventor:
Benjamin F. Teetor
By Wilkinson, Huxley, Byron & Knight
Attys

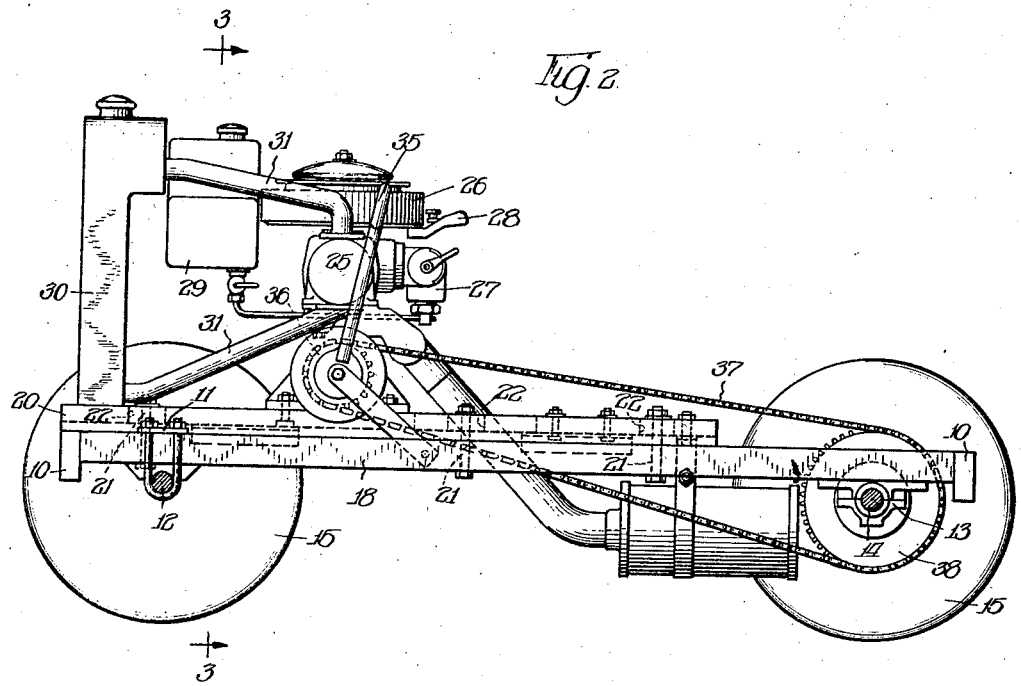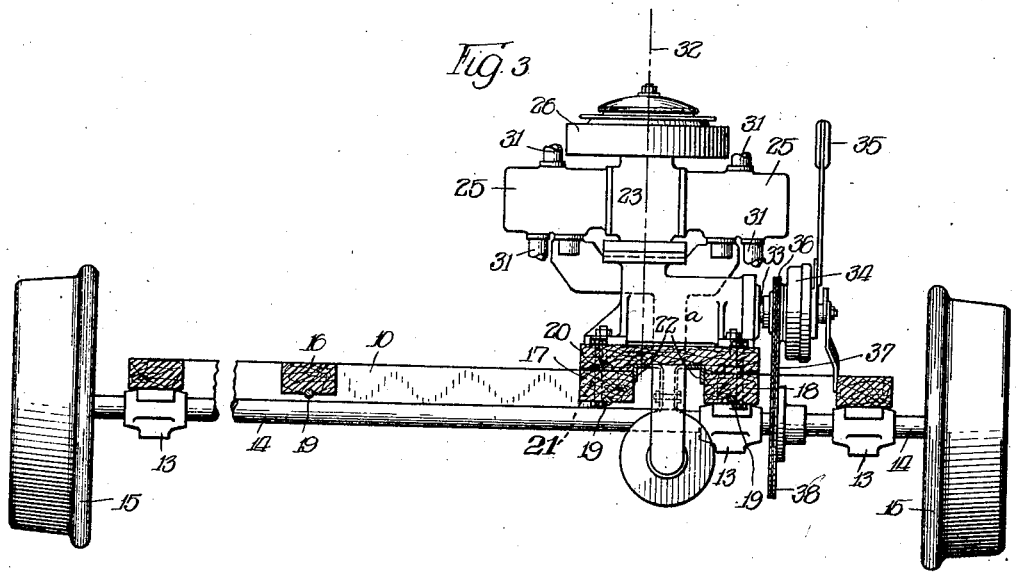

Patented Apr. 23, 1929.

1,709,961

UNITED STATES PATENT OFFICE.

BENJAMIN F. TEETOR, OF HAGERSTOWN, INDIANA.

MOTOR-DRIVEN CAR.

Application filed September 22, 1927. Serial No. 221,205.

The present invention relates to improvements in motor driven cars.

More particularly the present invention relates to inspection cars adapted to travel upon railroad rails. Such cars have been provided with internal combustion motors, but the vibration which has been set up by said motors as heretofore installed has been very annoying to the passengers on the car and has been destructive of the parts of the motor and the car.

An object of the present invention is to provide a motor driven car of the type adapted to inspection car service in which vibration is reduced to a minimum.

A further object is to provide a car of the inspection car type in which the effects of vibration are minimized without the use of expensive cushioning devices.

A further object is to provide a relatively simple car of the inspection car type in which vibrations set up by the motor are taken in such a plane that such vibrations are not communicated to the frame of the car.

Further objects will appear as the description proceeds.

Referring to the drawings—

Figure 2 is a sectional view taken along the plane indicated by the arrows 2—2 of Figure 1; and Figure 3 is a sectional view taken along the plane indicated by the arrows 3—3 of Figure 2.

Figure 1:
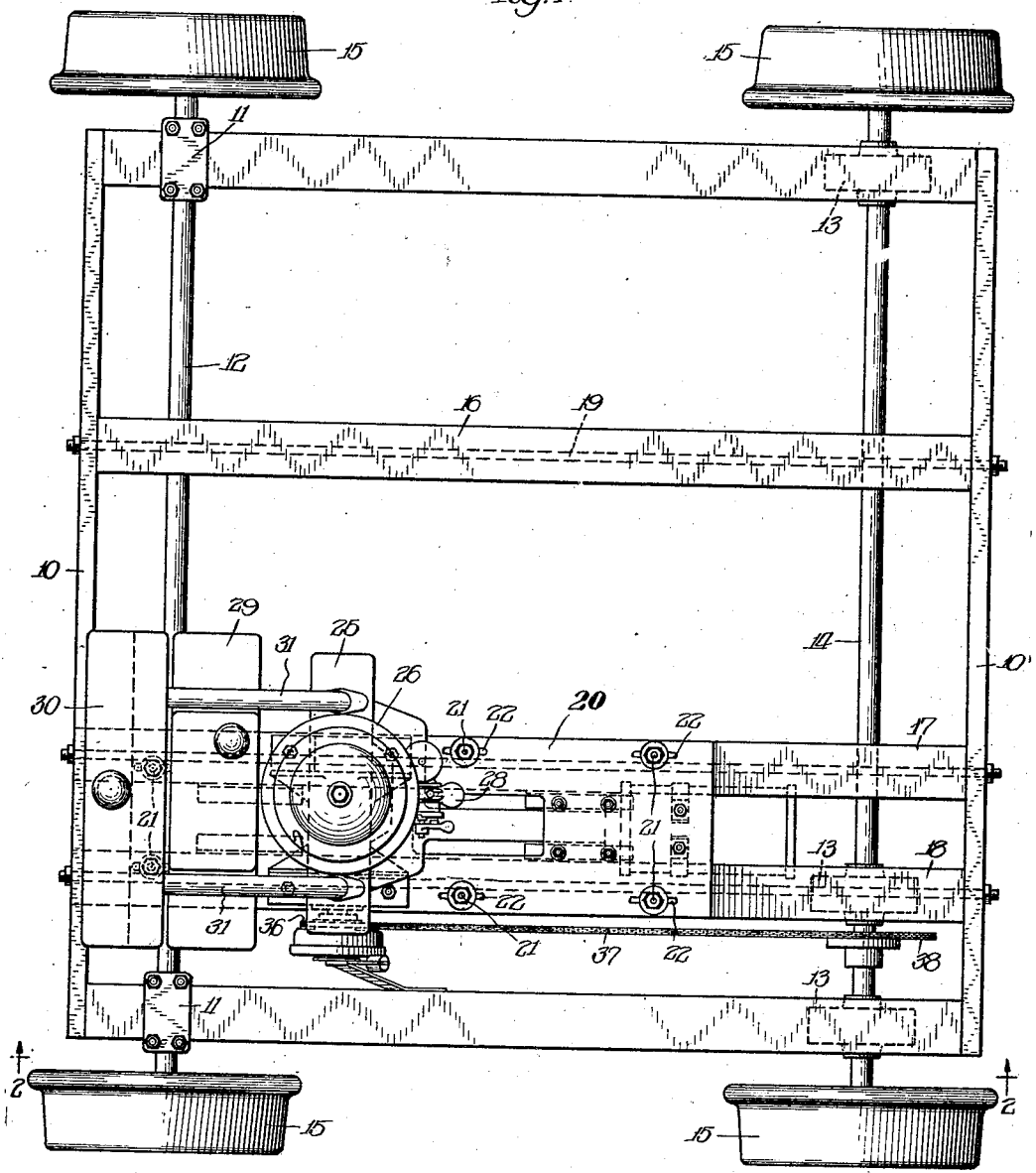
Figure 1 is a top plan view of a practical embodiment of the present invention.

The illustrated embodiment of the present invention includes a frame 10, which may be rectangular in conformation. Said frame 10 carries bearings 11—11 for securing the front axle 12, which may be a rigid axle. At the rear of the car are bearings 13—13 adapted to support the rear axle 14. Railroad wheels 15—15 are mounted upon the two axles referred to. The rear axle 14 is preferably a rotary axle and is provided with power transmitting mechanism, which will be referred to in detail hereinafter. It will be understood, of course, that if the front axle 12 is a rigid axle, the wheels 15 will be rotatably mounted upon said axle 12. Inasmuch as the rear axle 14 is preferably a rotatable axle, the wheels 15 associated with the rear axle 14 will be keyed or otherwise secured thereto.

The frame 10 is braced from front to rear by a plurality of fore and aft members 16, 17 and 18, which may take the form of timbers and which may have their extremities bolted or otherwise secured to the frame 10. The frame 10 may also be braced by tie rods 19—19, which may underlie the fore and aft members 16, 17 and 18.

The fore and aft members 17 and 18 constitute supporting members for the power plant or power unit which will now be referred to. The numeral 20 indicates the power unit platform, which may be constructed of wood and which may rest directly upon the fore and aft members 17 and 18. Bolts 21—21 are provided for holding the platform 20 in predetermined position, which bolts 21 extend through slots 22 in said platform, whereby said platform may be adjusted to compensate for chain stretch in a manner which will be referred to further hereinafter. The power unit platform may be guided by means of angles $22^a$—$22^a$ or equivalent means, which angles may be secured to the platform and which may have bearing engagement with the sides of the fore and aft members 17 and 18. Said guide members have the further function of holding the parts against warpage in service.

The power unit preferably consists of a multiple cylinder internal combustion engine. In a practical embodiment of the present invention such as illustrated in the drawings a two-cylinder, two-stroke cycle motor has proven eminently satisfactory. The motor is indicated as a whole by the numeral 23, and as shown comprises the base 24, which is bolted or otherwise secured to the platform 20. Said motor 23 comprises the pair of cylinders 25—25, which are preferably coaxially disposed, the axis of said cylinders being located substantially transversely of the line of movement of the car, as clearly shown in Figure 1. The motor 23 is provided with the fly wheel 26, the carburetor 27, the spark control 28, the gasolene tank 29, the radiator 30, the water lines 31—31 from the radiator to the cylinders of the motor, and the other usual features of an internal combustion motor.

A salient feature of the present invention is that the shaft of the motor 23 is disposed vertically, or substantially vertically. The axis of the shaft of the motor 23 is indicated by the center line 32 in Figure 3.

The vertical shaft of the motor 23 is connected by means of bevel gears (not shown), or other power transmitting mechanism, to the horizontal jack shaft 33, which is preferably disposed transversely of the car. Cooperatively associated with the jack shaft 33 is the clutch 34, which is controlled by the clutch lever 35. Said clutch 34 controls the connection of the jack shaft 33 with the chain sprocket 36. The sprocket 36 is adapted to communicate power to the chain 37, which meshes with the sprocket 38 keyed to the rear axle 14 of the car.

The function of the above described apparatus will be clear without detailed explanation. It will be noted that the power plant is in a single unit carried by the platform 20, which platform is adjustably mounted upon the fore and aft members 17 and 18. By reason of the slotted connection between the platform 20 and the fore and aft members 17 and 18, said platform and consequently the power unit may be adjusted fore and aft of the car, whereby to compensate for changes in the length of the sprocket chain 37. By reason of the fact that the cylinders 25—25 of the motor 23 are disposed horizontally, the shocks due to stopping and starting of the pistons in said cylinders are dissipated transversely of the car, whereby a minimum effect of said shocks is communicated to the frame of the car. By reason of this construction the amount of cushioning which is necessary to protect the parts against the crystallizing effects of vibration is reduced to a minimum. As a matter of fact, the cushioning effect of the timbers comprising the fore and aft members 17 and 18 is sufficient in a practical embodiment of the present invention to take care of the small vibration which is communicated to said timbers by the motor. Practical operation has demonstrated the fact that the only time that vibration is communicated from the motor to the car to any appreciable extent is when the clutch 34 is operated to connect the motor to the chain sprocket 36 for communicating driving movement to the car.

Attention is directed to the fact that the entire power plant is adjusted as a whole, whereby it is unnecessary in making adjustments to provide flexible connections or flexible joints. A further decided practical advantage accrues when the device is being shipped, as for example on shipboard. There is a decidedly practical advantage in removing the power plant from the frame 10 and cleating the power plant directly to the crate. Moreover, when a plurality of the devices are being shipped by freight, a plurality of power plants may be nested together, reducing bulk to a minimum. Still another decided practical advantage is that the ready removability and replaceability of the power plant permits a power plant to be taken from its frame and put in the shops for repairs or adjustment, a reserve power plant being mounted upon the frame while the first one is being serviced. It will be noted that the assembly and disassembly of the power plant relative to the base is a very simple matter well within the skill of the ordinary worker.

Though a preferred embodiment of the present invention has been described in detail, many modifications may be made without departing from the spirit of the invention. It is intended to cover all such modifications that fall within the scope of the appended claims.

What is claimed is—

1. In a car of the type described, a frame, wheels for supporting said frame, an internal combustion motor for communicating power to said wheels, said motor having two opposed cylinders having their axes coaxially disposed transversely of the line of movement of said car, said motor having its power transmitting shaft disposed in a substantially vertical position.

2. In a car of the type described, a frame, wheels for supporting said frame, an internal combustion motor for communicating power to said wheels, said motor having a pair of cylinders coaxially disposed transversely of said car, a vertical shaft for delivering power from said cylinders, a jack shaft disposed transversely of said car, power transmitting means between said vertical shaft and said jack shaft, and power transmitting means between said jack shaft and said wheels.

3. In a car of the type described, a frame, wheels for supporting said frame, and an internal combustion engine for communicating power to said wheels, said motor having two cylinders having their axes in the same vertical plane, said motor having its power transmitting shaft disposed in a substantially vertical position.

Signed at Hagerstown, Indiana, this 19th day of September, 1927.

BENJAMIN F. TEETOR.